US010650049B2

(12) United States Patent
Malik et al.

(10) Patent No.: US 10,650,049 B2
(45) Date of Patent: *May 12, 2020

(54) ASSOCIATION SIGNIFICANCE (71) Applicant: Thomson Reuters Global Resources Unlimited Company, Baar (CH)

(72) Inventors: Hassan H. Malik, Monmouth Junction, NJ (US); Mans Olof-Ors, Lucerne (CH)

(73) Assignee: REFINITIV US ORGANIZATION LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/351,256

(22) Filed: Nov. 14, 2016

(65) Prior Publication Data
US 2017/0220674 A1     Aug. 3, 2017

Related U.S. Application Data

(63) Continuation of application No. 13/107,665, filed on May 13, 2011, now Pat. No. 9,495,635.

(60) Provisional application No. 61/445,236, filed on Feb. 22, 2011.

(51) Int. Cl.
| *G06F 16/901* | (2019.01) |
| *G06F 16/35* | (2019.01) |
| *G06F 16/90* | (2019.01) |
| *G06F 16/951* | (2019.01) |
| *G06N 20/00* | (2019.01) |

(52) U.S. Cl.
CPC ........ *G06F 16/9024* (2019.01); *G06F 16/355* (2019.01); *G06F 16/90* (2019.01); *G06N 20/00* (2019.01); *G06F 16/951* (2019.01)

(58) Field of Classification Search
USPC ........................................................ 707/737
See application file for complete search history.

(56) References Cited

U.S. PATENT DOCUMENTS

| 5,768,578 | A  | * | 6/1998  | Kirk    | G06F 16/954   |
| 6,886,010 | B2 | * | 4/2005  | Kostoff | G06F 17/30705 |
| 8,082,278 | B2 | * | 12/2011 | Agrawal | G06F 17/3064  |
|           |    |   |         |         | 707/802       |

(Continued)

*Primary Examiner* — Tamara T Kyle
*Assistant Examiner* — Raheem Hoffler
(74) *Attorney, Agent, or Firm* — Duncan Galloway Egan Greenwald, PLLC; Kevin T. Duncan (57) ABSTRACT

Systems and techniques for determining significance between entities are disclosed. The systems and techniques identify a first entity having an association with a second entity, apply a plurality of association criteria to the association, weight each of the criteria based on defined weight values, and compute a significance score for the first entity with respect to the second entity based on a sum of a plurality of weighted criteria values. The systems and techniques utilize information from disparate sources to create a uniquely powerful signal. The systems and techniques can be used to identify the significance of relationships (e.g., associations) among various entities including, but not limited to, organizations, people, products, industries, geographies, commodities, financial indicators, economic indicators, events, topics, subject codes, unique identifiers, social tags, industry terms, general term/s, metadata elements, classification codes, and combinations thereof.

10 Claims, 4 Drawing Sheets

(56) References Cited

U.S. PATENT DOCUMENTS

| | | | | |
|---|---|---|---|---|
| 8,805,843 | B2* | 8/2014 | Chen | G06N 5/022 |
| | | | | 707/738 |
| 9,495,635 | B2* | 11/2016 | Malik | G06K 9/6259 |
| 9,721,039 | B2* | 8/2017 | Bier | G06Q 10/10 |
| 2002/0105550 | A1* | 8/2002 | Biebesheimer | G06F 16/338 |
| | | | | 715/835 |
| 2003/0225750 | A1* | 12/2003 | Farahat | G06F 16/951 |
| 2006/0117252 | A1* | 6/2006 | Du | G06F 17/27 |
| | | | | 715/255 |
| 2006/0167857 | A1* | 7/2006 | Kraft | G06F 17/30528 |
| 2008/0109454 | A1* | 5/2008 | Willse | G06F 16/313 |
| 2009/0119261 | A1* | 5/2009 | Ismalon | G06F 16/3322 |
| 2009/0132525 | A1* | 5/2009 | Hattori | G06F 17/30864 |
| 2009/0193050 | A1* | 7/2009 | Olson | G06F 16/211 |
| 2010/0042405 | A1* | 2/2010 | Tsuzuki | G06F 17/3064 |
| | | | | 704/10 |
| 2010/0138377 | A1* | 6/2010 | Wright | G06F 17/30516 |
| | | | | 706/52 |
| 2010/0262454 | A1* | 10/2010 | Sommer | G06F 17/3071 |
| | | | | 706/20 |
| 2011/0258193 | A1* | 10/2011 | Brdiczka | G06F 17/2715 |
| | | | | 707/739 |
| 2011/0282878 | A1* | 11/2011 | Bird | G06F 17/30737 |
| | | | | 707/740 |
| 2012/0158687 | A1* | 6/2012 | Fang | G06N 5/02 |
| | | | | 707/706 |

* cited by examiner

| # | Measure | Formula |
|---|---|---|
| 1 | $\phi$-coefficient | $\dfrac{P(A,B)-P(A)P(B)}{\sqrt{P(A)P(B)(1-P(A))(1-P(B))}}$ |
| 2 | Goodman-Kruskal's ($\lambda$) | $\dfrac{\sum_j \max_k P(A_j,B_k)+\sum_k \max_j P(A_j,B_k)-\max_j P(A_j)-\max_k P(B_k)}{2-\max_j P(A_j)-\max_k P(B_k)}$ |
| 3 | Odds ratio ($\alpha$) | $\dfrac{P(A,B)P(\overline{A},\overline{B})}{P(A,\overline{B})P(\overline{A},B)}$ |
| 4 | Yule's $Q$ | $\dfrac{P(A,B)P(\overline{AB})-P(A,\overline{B})P(\overline{A},B)}{P(A,B)P(\overline{AB})+P(A,\overline{B})P(\overline{A},B)} = \dfrac{\alpha-1}{\alpha+1}$ |
| 5 | Yule's $Y$ | $\dfrac{\sqrt{P(A,B)P(\overline{AB})}-\sqrt{P(A,\overline{B})P(\overline{A},B)}}{\sqrt{P(A,B)P(\overline{AB})}+\sqrt{P(A,\overline{B})P(\overline{A},B)}} = \dfrac{\sqrt{\alpha}-1}{\sqrt{\alpha}+1}$ |
| 6 | Kappa ($\kappa$) | $\dfrac{P(A,B)+P(\overline{A},\overline{B})-P(A)P(B)-P(\overline{A})P(\overline{B})}{1-P(A)P(B)-P(\overline{A})P(\overline{B})}$ |
| 7 | Mutual Information ($M$) | $\dfrac{\sum_i \sum_j P(A_i,B_j)\log\frac{P(A_i,B_j)}{P(A_i)P(B_j)}}{\min(-\sum_i P(A_i)\log P(A_i), -\sum_j P(B_j)\log P(B_j))}$ |
| 8 | J-Measure ($J$) | $\max\left(P(A,B)\log(\frac{P(B\mid A)}{P(B)}) + P(A\overline{B})\log(\frac{P(\overline{B}\mid A)}{P(\overline{B})}),\right.$ $\left. P(A,B)\log(\frac{P(A\mid B)}{P(A)}) + P(\overline{A}B)\log(\frac{P(\overline{A}\mid B)}{P(\overline{A})})\right)$ |
| 9 | Gini index ($G$) | $\max\left(P(A)[P(B\mid A)^2 + P(\overline{B}\mid A)^2] + P(\overline{A})[P(B\mid \overline{A})^2 + P(\overline{B}\mid \overline{A})^2]\right.$ $-P(B)^2 - P(\overline{B})^2,$ $P(B)[P(A\mid B)^2 + P(\overline{A}\mid B)^2] + P(\overline{B})[P(A\mid \overline{B})^2 - P(\overline{A}\mid \overline{B})^2]$ $\left.-P(A)^2 - P(\overline{A})^2\right)$ |
| 10 | Support ($s$) | $P(A,B)$ |
| 11 | Confidence ($c$) | $\max(P(B\mid A), P(A\mid B))$ |
| 12 | Laplace ($L$) | $\max\left(\dfrac{NP(A,B)+1}{NP(A)+2}, \dfrac{NP(A,B)+1}{NP(B)+2}\right)$ |
| 13 | Conviction ($V$) | $\max\left(\dfrac{P(A)P(\overline{B})}{P(A\overline{B})}, \dfrac{P(B)P(\overline{A})}{P(\overline{B}A)}\right)$ |
| 14 | Interest ($I$) | $\dfrac{P(A,B)}{P(A)P(B)}$ |
| 15 | cosine ($IS$) | $\dfrac{P(A,B)}{\sqrt{P(A)P(B)}}$ |
| 16 | Piatetsky-Shapiro's ($PS$) | $P(A,B) - P(A)P(B)$ |
| 17 | Certainty factor ($F$) | $\max\left(\dfrac{P(B\mid A)-P(B)}{1-P(B)}, \dfrac{P(A\mid B)-P(A)}{1-P(A)}\right)$ |
| 18 | Added Value ($AV$) | $\max(P(B\mid A) - P(B), P(A\mid B) - P(A))$ |
| 19 | Collective strength ($S$) | $\dfrac{P(A,B)+P(\overline{AB})}{P(A)P(B)+P(\overline{A})P(\overline{B})} \times \dfrac{1-P(A)P(B)-P(\overline{A})P(\overline{B})}{1-P(A,B)-P(\overline{AB})}$ |
| 20 | Jaccard ($\zeta$) | $\dfrac{P(A,B)}{P(A)+P(B)-P(A,B)}$ |
| 21 | Klosgen ($K$) | $\sqrt{P(A,B)}\max(P(B\mid A) - P(B), P(A\mid B) - P(A))$ |

FIG. 4

ASSOCIATION SIGNIFICANCE

CROSS-REFERENCE TO RELATED APPLICATION

This application is a continuation of U.S. patent application Ser. No. 13/107,665, entitled ASSOCIATION SIGNIFICANCE, which claims priority to U.S. Provisional Application No. 61/445,236 filed Feb. 22, 2011, entitled 'Information Processing and Visualization Methods and Systems', the content of which is incorporated herein in its entirety.

TECHNICAL FIELD

This disclosure relates to entity associations, and more particularly to systems and techniques for measuring entity associations.

BACKGROUND

Today, investment decisions in the financial markets require careful analysis of information available from multiple sources. To meet this challenge, financial institutions typical maintain very large datasets that provide a foundation for this analysis. For example, forecasting stock market, currency exchange rate, bank bankruptcies, understanding and managing financial risk, trading futures, credit rating, loan management, bank customer profiling, and money laundering analyses all require large datasets of information for analysis. The datasets of information can be structured datasets as well as unstructured data sets.

Typically, the datasets of information are used to model one or more different entities, each of which may have a relationship with other entities. For example, a company entity may be impacted by, and thereby have a relationship with, any of the following entities: a commodity (e.g., aluminum, corn, crude oil, sugar, etc.), a currency (e.g., euro, sterling, yen, etc.), and one or more competitor. Any change in one entity can have an impact on another entity. For example, rising crude oil prices can impact a transportation company's revenues, which can affect the company's valuation.

Given the quantity and nature of these datasets, each modeled entity tends to have multiple relationships with a large number of other entities. As such, it is difficult to identify which entities are more significant than others for a given entity.

Accordingly, there is a need for systems and techniques to automatically analyze all available data and assign significance scores to entity relationships.

SUMMARY

Systems and techniques for determining significance between entities are disclosed. The systems and techniques identify a first entity having an association with a second entity, apply a plurality of association criteria to the association, weight each of the criteria based on defined weight values, and compute a significance score for the first entity with respect to the second entity based on a sum of a plurality of weighted criteria values. The systems and techniques utilize information from disparate sources to create a uniquely powerful signal. The systems and techniques can be used to identify the significance of relationships (e.g., associations) among various entities including, but not limited to, organizations, people, products, industries, geographies, commodities, financial indicators, economic indicators, events, topics, subject codes, unique identifiers, social tags, industry terms, general terms, metadata elements, classification codes, and combinations thereof.

Various aspects of the invention relate to applying interestingness criteria to entity associations and weighting values associated with the interestingness criteria to generate a significance score.

For example, according to one aspect, a method of computing significance between entities includes identifying a first entity and a second entity from a plurality of entities, the first entity having a first association with the second entity, and the second entity having a second association with the first entity, and weighting a plurality of criteria values assigned to the first association. The plurality of criteria values based on a plurality of association criteria selected from the group consisting essentially of interestingness, recent interestingness, validation, shared neighbor, temporal significance, context consistency, recent activity, current clusters, and surprise element.

The method also includes computing a significance score for the first entity with respect to the second entity based on a sum of the plurality of weighted criteria values for the first association, the significance score indicating a level of significance of the second entity to the first entity, generating a signal associated with the computed significance score, and transmitting the signal.

In one embodiment, the plurality of entities represent one or more of the following: organizations, people, products, industries, geographies, commodities, financial indicators, economic indicators, events, topics, subject codes, unique identifiers, social tags, industry terms, general terms, metadata elements, classification codes, and combinations thereof. The plurality of entities may be identified from a set of documents, a structured data store, such as a database, or a combination thereof.

In another embodiment, the method further includes representing the plurality of entities in a computer memory using a computer-implemented data structure. For example, in one embodiment, the computer-implemented data structure is a directed graph, wherein vertices of the directed graph represent the plurality of entities, and edges of the directed graph represent associations between each the plurality of entities. The method may also include generating the associations using first entity and second entity co-occurrences in the set of documents.

In one embodiment, the method includes applying the interestingness criteria to the first association, wherein the interestingness criteria is based on a suitable measure such as (but not limited to) one of the following interestingness measures: correlation coefficient, Goodman-Kruskal's lambda ($\lambda$), Odds ratio ($\alpha$), Yule's Q, Yule's Y, Kappa ($\kappa$), Mutual Information (M), J-Measure (J), Gini-index (G), Support (s), Confidence (c), Laplace (L), Conviction (V), Interest (I), cosine (IS), Piatetsky-shaporo's (PS), Certainty factor (F), Added Value (AV), Collective Strength (5), Jaccard Index, and Klosgen (K). The method also includes assigning a value to one of the plurality of criteria values based on the one association measure.

The method may include applying the recent interestingness criteria to the first association, wherein the recent interestingness criteria is applied to the first association using a portion of at least one of the set of documents and the structured data store, the portion associated with a configurable pre-determined time interval and a suitable measure such as (but not limited to) one of the following interestingness measures: correlation coefficient, Goodman- Kruskal's lambda (κ), Odds ratio (α), Yule's Q, Yule's Y, Kappa (κ), Mutual Information (M), J-Measure (I), Gini-index (G), Support (s), Confidence (c), Laplace (L), Conviction (V), Interest (I), cosine (IS), Piatetsky-shaporo's (PS), Certainty factor (F), Added Value (AV), Collective Strength (S), Jaccard Index, and Klosgen (K). The method also includes assigning a value to one of the plurality of criteria values based on the one association measure.

The method may include applying the validation criteria to the first association, wherein applying the validation criteria includes determining whether the first entity and the second entity co-exist as entity pairs in a pre-defined pair set, each of the pre-defined entity pairs identifying a known relationship between one another, and assigning a value to one of the plurality of criteria values based on the determination.

In one embodiment, the method may include applying the shared neighbor criteria to the first association, wherein applying the shared neighbor criteria includes determining a subset of entities having edges extending a pre-determined distance from the first entity and the second entity. The subset of entities represents an intersection of nodes neighboring the first entity and the second entity. The method also including computing an association value based at least in part on a number of entities included in the subset of entities, and assigning a value to one of the plurality of criteria values based on the computed association value.

In yet another embodiment, the method may include applying the temporal significance criteria to the first association, wherein applying the temporal significance criteria includes applying interestingness criteria using a first portion of at least one of the set of documents and the structured data store, the first portion associated with a first time interval and a second portion of the at least one of the set of documents and the structured data store. The second portion is associated with a second time interval and is different from the first time interval. The interestingness criteria includes, but is not limited to, one of the following interestingness measures: correlation coefficient, Goodman-Kruskal's lambda (λ), Odds ratio (α), Yule's Q, Yule's Y, Kappa (κ), Mutual Information (M), J-Measure Gini-index (G), Support (s), Confidence (c), Laplace (L), Conviction (V), Interest (I), cosine (IS), Piatetsky-shaporo's (PS), Certainty factor (F), Added Value (AV), Collective Strength (S), Jaccard Index, and Klosgen (K). The method also includes determining a difference value between a first association measure associated with the first time interval and a second association measure associated with the second time interval, and assigning a value to one of the plurality of criteria values based on the determined difference value.

The method may include applying the context consistency criteria to the first association, wherein applying the context consistency criteria includes determining a frequency of the first entity and the second entity occurring in a context. The context may be selected from any of the following: organizations, people, products, industries, geographies, commodities, financial indicators, economic indicators, events, topics, subject codes, unique identifiers, social tags, industry terms, general terms, metadata elements, classification codes, and combinations thereof. The method also includes assigning a value to one of the plurality of criteria values based on the determined frequency.

In one embodiment, the method includes applying the recent activity criteria to the first association, wherein applying the recent activity criteria includes computing an average of occurrences of the first entity and the second entity occurring in at least one of the set of documents and the structured data store, comparing the computed average of occurrences to an overall occurrence average associated with other entities in a same geography or business, and assigning a value to one of the plurality of criteria values based on the comparison. The computed average of occurrences and the overall occurrence average may also be seasonally adjusted.

The method may also include applying the current clusters criteria to the first association, wherein applying the current clusters criteria includes determining a number of clusters that comprise the first entity and the second entity, comparing the number of clusters to an average number of clusters including entity pairs associated with a defined context and not including the first entity and the second entity as one of the entity pairs. The defined context may include an industry or geography applicable to the first entity and the second entity. The method also includes assigning a value to one of the plurality of criteria values based on the comparison. In one embodiment, the method also includes clustering the plurality of entities using a clustering algorithm.

In yet another embodiment, the method includes applying the surprise element criteria to the first association, wherein applying the surprise element criteria includes comparing a first context in which the first entity and the second entity occur in a prior time interval associated with a portion of at least one of the set of documents and the structured data store, to a second context in which the first entity and the second entity occur in a subsequent time interval associated with a different portion of the at least one of the set of documents and the structured data store. The method also includes assigning a value to one of the plurality of criteria values based on the comparison.

The method may include multiplying a user-configurable value associated with each of the plurality of criteria with each of the plurality of criteria values, and summing the plurality of multiplied values.

Additional systems, methods, as well as articles that include a machine-readable medium storing machine-readable instructions for implementing the various techniques, are disclosed. Details of various implementations are discussed in greater detail below.

BRIEF DESCRIPTION OF THE DRAWINGS

FIG. 4 illustrates exemplary interestingness measures.

Like reference symbols in the various drawings indicate like elements.

DETAILED DESCRIPTION

Figure 1:
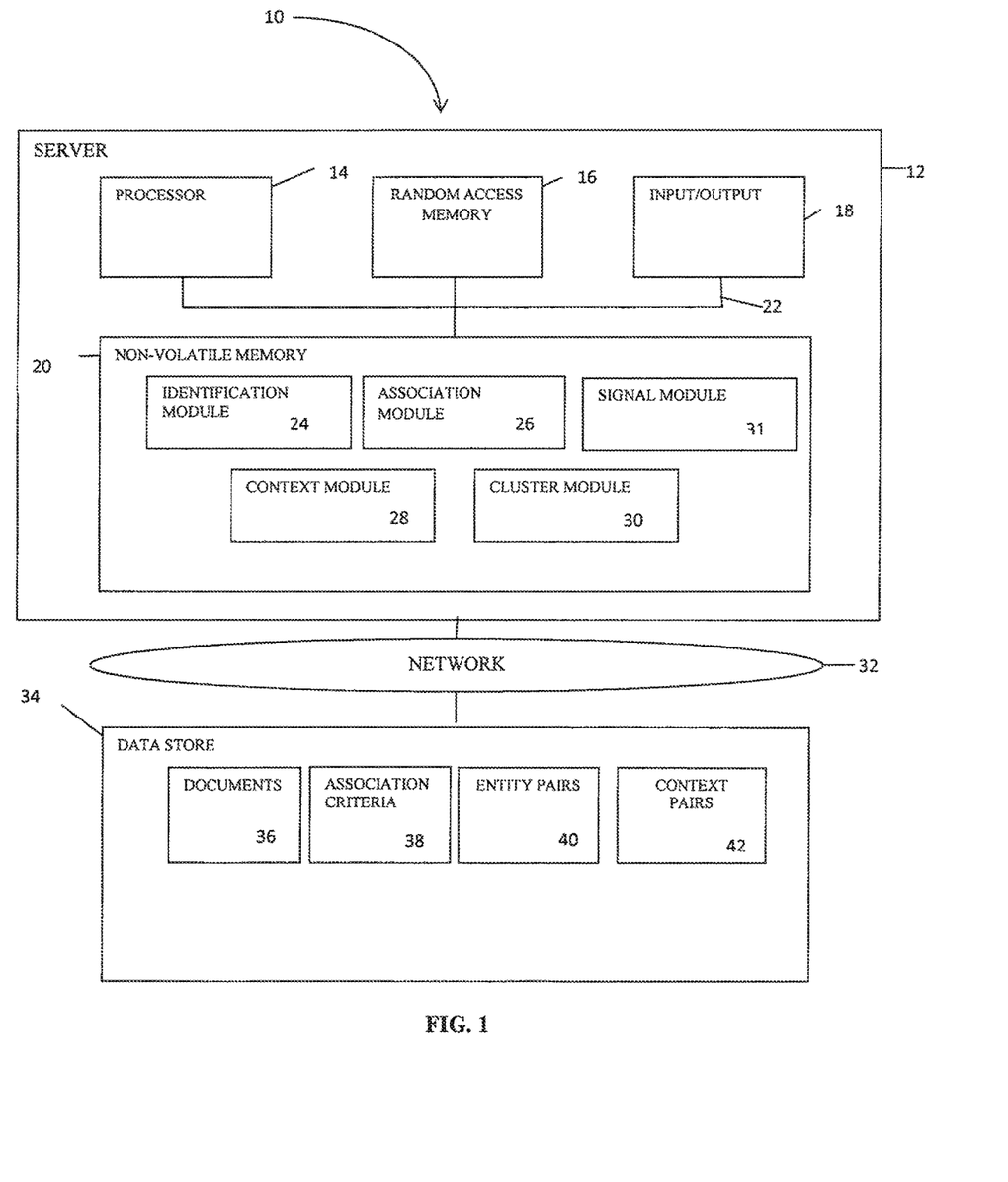
FIG. 1 is a schematic of an exemplary computer-based system for computing connection significance between entities.

Turning now to FIG. 1, an example of a suitable computing system 10 within which embodiments of the present invention may be implemented is disclosed. The computing system 10 is only one example and is not intended to suggest any limitation as to the scope of use or functionality of the invention. Neither should the computing system 10 be interpreted as having any dependency or requirement relating to any one or combination of illustrated components.

For example, the present invention is operational with numerous other general purpose or special purpose computing consumer electronics, network PCs, minicomputers, mainframe computers, laptop computers, as well as distributed computing environments that include any of the above systems or devices, and the like.

The invention may be described in the general context of computer-executable instructions, such as program modules, being executed by a computer. Generally, program modules include routines, programs, objects, components, data structures, loop code segments and constructs, etc. that perform particular tasks or implement particular abstract data types. The invention can be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art can implement the description and figures as processor executable instructions, which can be written on any form of a computer readable media.

In one embodiment, with reference to FIG. 1, the system 10 includes a server device 12 configured to include a processor 14, such as a central processing unit (CPU), random access memory (RAM') 16, one or more input-output devices 18, such as a display device (not shown) and keyboard (not shown), umd non-volatile memory 20, all of which are interconnected via a common bus 22 and controlled by the processor 14.

As shown in the FIG. 1 example, in one embodiment, the non-volatile memory 20 is configured to include an identification module 24 for identifying entities from one or more sources. The entities identified may include, but are not limited to, organizations, people, products, industries, geographies, commodities, financial indicators, economic indicators, events, topic codes, subject codes, unique identifiers, social tags, industry terms, general terms, metadata elements, and classification codes. An association module 26 is also provided for computing a significance score for an association between entities, the significance score being an indication of the level of significance a second entity to a first entity.

In one embodiment, a context module 28 is provided for determining a context (e.g., a circumstance, background) in which an identified entity is typically referenced in or referred to, a cluster module 30 for clustering (e.g., categorizing) identified entities, and a signal module 31 for generating and transmitting a signal associated with the computed significance score. Additional details of these modules 24, 26, 28, 30 and 32 are discussed in connection with FIGS. 2, 3 and 4.

As shown in FIG. 1, in one embodiment, a network 32 is provided that can include various devices such as routers, server, and switching elements connected in an Intranet, Extranet or Internet configuration. In one embodiment, the network 32 uses wired communications to transfer information between an access device (not shown), the server device 12, and a data store 34. In another embodiment, the network 32 employs wireless communication protocols to transfer information between the access device, the server device 12, and the data store 34. In yet other embodiments, the network 32 employs a combination of wired and wireless technologies to transfer information between the access device, the server device 12, and the data store 34.

The data store 34 is a repository that maintains and stores information utilized by the before-mentioned modules 24, 26, 28, 30 and 31. In one embodiment, the data store 34 is a relational database. In another embodiment, the data store 34 is a directory server, such as a Lightweight Directory Access Protocol ('LDAP'). In yet another embodiment, the data store 34 is an area of non-volatile memory 20 of the server 12.

In one embodiment, as shown in the FIG. 1 example, in one embodiment, the data store 34 includes a set of documents 36 that are used to identify one or more entities. As used herein, the words 'set' and 'sets' refer to anything from a null set to a multiple element set. The set of documents 36 may include, but are not limited to, one or more papers, memos, treatises, news stories, articles, catalogs, organizational and legal documents, research, historical documents, policies and procedures, business documents, and combinations thereof. In another embodiment, the data store 34 includes a structured data store, such as a relational or hierarchical database, that is used to identify one or more entities. In yet another embodiment, sets of documents and structured data stores are used to identify one or more entities.

A set of association criteria 38 is provided that comprises contingency tables used by the association module 26 to compute a significance score for an identified relationship between entities. In one embodiment, the contingency tables are associated with a set of interestingness measures that are used by the association module 26 to compute the significance score. An example of interestingness measures, along with each respective formulation, is shown in connection with FIG. 4.

The data store 34 also includes a set of entity pairs 40. Each pair included in the set of entity pairs 40 represents a known relationship existing between at least two identified entities. In one embodiment, the relationship is identified by an expert upon reviewing one of the set of documents 36. In another embodiment, the relationship is identified from the one or more set of documents 36 using a computer algorithm included in the context module 28. For example, upon reviewing a news story, an expert and/or the context module 28 may identify the presence of two entities occurring in the same news story, As shown in FIG. 1, in one embodiment, a set of context pairs 42 are also provided. Each of the set of context pairs 42 represents a context that exists between at least two entities. For example, whenever a particular topic or item is discussed in a news story, the two entities also are mentioned in the same news story. Similar to the set of entity pairs 40 discussed previously, the set of context pairs may also be identified by an expert, or a computer algorithm included in the context module 28. Additional details concerning information included in the data store 34 are discussed in greater detail below.

Although the data store 34 shown in FIG. 1 is connected to the network 32, it will be appreciated by one skilled in the art that the data store 34 and/or any of the information shown therein, can be distributed across various servers and be accessible to the server 12 over the network 32, be coupled directly to the server 12, or be configured in an area of non-volatile memory 20 of the server 12.

Further, it should be noted that the system 10 shown in FIG. 1 is only one embodiment of the disclosure. Other system embodiments of the disclosure may include additional structures that are not shown, such as secondary storage and additional computational devices. In addition, various other embodiments of the disclosure include fewer structures than those shown in FIG. 1. For example, in one embodiment, the disclosure is implemented on a single computing device in a non-networked standalone configuration. Data input and requests are communicated to the computing device via an input device, such as a keyboard and/or mouse. Data output, such as the computed significance score, of the system is communicated from the computing device to a display device, such as a computer monitor.

Figure 2:
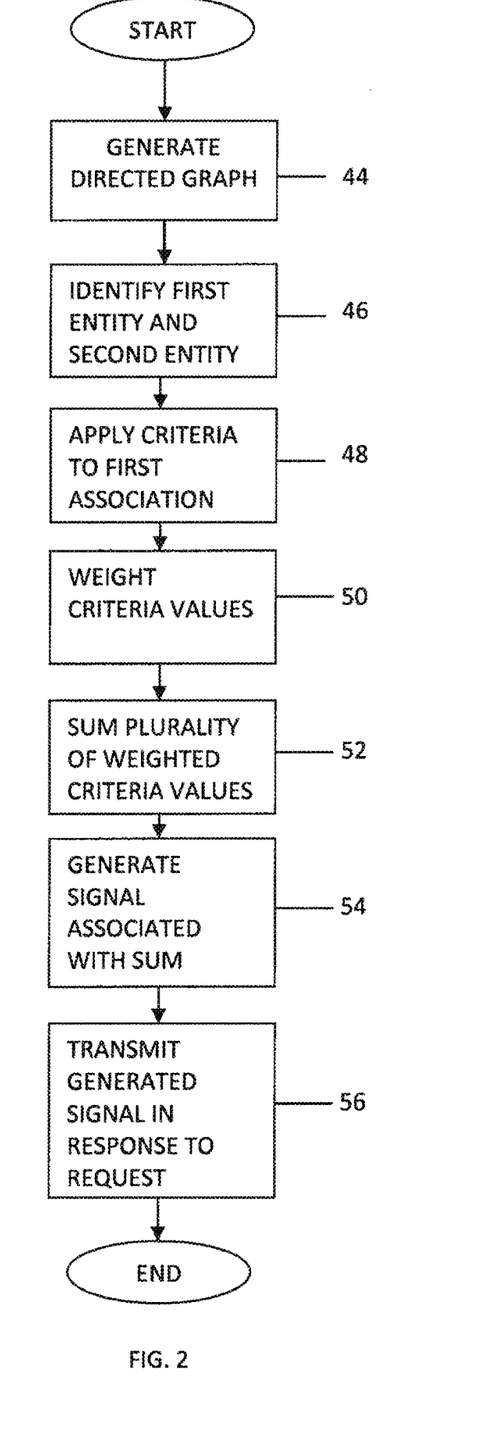
FIG. 2 illustrates an exemplary method for determining connection significance between entities according to one embodiment of the invention.

Turning now to FIG. 2, an example method for determining connection significance between entities is disclosed. As shown in the FIG. 2 example, at step 44, the identification module 24 first generates a directed graph to represent entities identified in each of the set of documents 36. In one embodiment, the identification module 24 determines a frequency and co-occurrence of each entity in each of the set of documents 36, and then generates a contingency table to record and determine associations. The set of documents may be structured documents, including but not limited to eXtensible Markup Language (XML) files, as well as unstructured documents including, but not limited to articles and news stories. As described previously, the present invention is not limited to only using a set of documents to identify entities. For example, the present invention may use structured data stores including, but not limited to, relational and hierarchical databases, either alone or in combination with the set of documents to identify entities.

Further, it will be appreciated that the present invention is not limited to a directed graph implementation, and that other computer-implemented data structures capable of modeling entity relationships may be used with the present invention, such as a mixed graph and multi graph.

Figure 3:
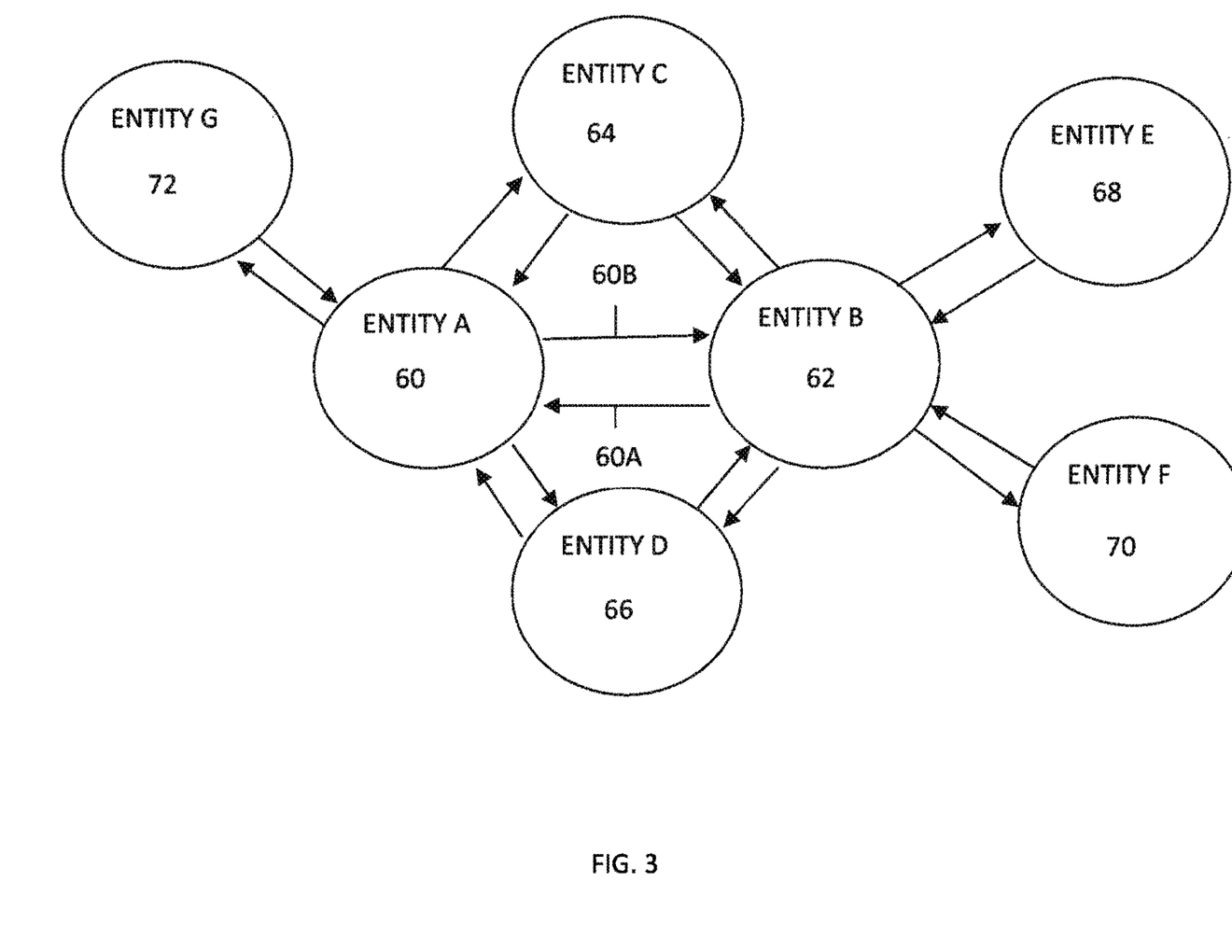
FIG. 3 is a schematic of an exemplary directed graph.

A schematic of an exemplary directed graph generated by the identification module 24 is shown in connection with FIG. 3. Each node 60, 62, 64, 66, 68, 70 and 72 of the graph represents an entity identified from one or more of the set of documents, and vertices (e.g., edges) of each node represent an association (e.g., relationship) between entities. For example, as shown in the FIG. 3 example, Entity A 60 has a first association 60A with Entity B 62 indicating a level of significance of Entity B 62 to Entity A 60, and a second association 60B with Entity B 62 indicating a level of significance of Entity A 60 to Entity B 62.

Referring back to FIG. 2, at step 46, the identification module 24 next identifies a first entity and at least one second entity from the directed graph. In one embodiment, the first entity is included in a user request and the second entity is determined by the identification module 24 using a depth-first search of the generated graph. In another embodiment, the identification module 24 uses the depth-first search on each node (e.g., first entity) of the graph to determine at least one other node (e.g., second entity).

Next, at step 48, once the first entity and second entity are identified, the association module 26 applies a plurality of association criteria 38 to one of the associations between the first entity and the second entity. The plurality of association criteria 38 include, but are not limited to, the following set of criteria: interestingness, recent interestingness, validation, shared neighbor, temporal significance, context consistency, recent activity, current clusters, and surprise element. Once the association criteria are applied, the association module 28 assigns criteria values to each of the association criteria.

For example, in one embodiment, the association module 26 may apply the interestingness criteria to the first association. Interestingness criteria are known to one skilled in the art and as a general concept, may emphasize concise- ness, coverage, reliability, peculiarity, diversity, novelty, surprisingness, utility, and actionability of patterns (e.g., relationships) detected among entities in data sets. In one embodiment, the interestingness criteria is applied by the association module 26 to all associations identified from the set of documents 36 and may include, but is not limited to, one of the following interestingness measures: correlation coefficient, Goodman-Kruskal's lambda ($\lambda$), Odds ratio ($\alpha$), Yule's Q, Yule's Y, Kappa ($\kappa$), Mutual Information (M), J-Measure (J), Gini-index (G), Support (s), Confidence (c), Laplace (L), Conviction (V), Interest (I), cosine (IS), Piatetsky-shaporo's (PS), Certainty factor (F), Added Value (AV), Collective Strength (S), Jaccard Index, and Klosgen (K). Once the interestingness criteria is applied to the first association, the association module 26 assigns a value to the interestingness criteria based on the interestingness measure.

A list of example interestingness measures with accompanied formulas used by the association module 26 is shown is shown in connection with FIG. 4. As shown in the FIG. 4 example, one of the interestingness measures includes a correlation coefficient ($\Phi$-coefficient) that measures the degree of linear interdependency between a pair of entities, represented by A and B in FIG. 4, respectively. The correlation coefficient is defined by the covariance between two entities divided by their standard deviations. The correlation coefficient equals zero (0) when entity A and entity B are independent and may range from minus one (−1) to positive one (+1).

In one embodiment, the association module 26 applies the recent interestingness criteria to the first association. The recent interestingness criteria may be applied by the association module 26 to associations identified from a portion of the set of documents 36 and/or a portion of a structured data store. The portion may be associated with a configurable pre-determined time interval. For example, the association module 26 may apply the recent interestingness criteria to only associations between entities determined from documents not older than six (6) months ago. Similar to the before-mentioned interestingness criteria, the recent interestingness criteria may include, but is not limited to, one of the following interestingness measures: correlation coefficient, Goodman-Kruskal's lambda ($\lambda$), Odds ratio ($\alpha$), Yule's Q, Yule's Y, Kappa ($\kappa$), Mutual Information (M), J-Measure (J), Gini-index (G), Support (s), Confidence (c), Laplace (L), Conviction (V), Interest (I), cosine (IS), Piatetsky-shaporo's (PS), Certainty factor (F), Added Value (AV), Collective Strength (S), Jaccard Index, and Klosgen (K). Once the recent interestingness criteria is applied to the first association, the association module 26 assigns a value to the recent interestingness criteria based on the interestingness measure.

The association module 26 may apply the validation criteria to the first association. In one embodiment, the association module 26 determines whether the first entity and the second entity co-exist as an entity pair in the set of entity pairs 40. As described previously, each of the entity pairs defined in the set of entity pairs 40 may be previously identified as having a relationship with one another. Based on the determination, the association module 26 assigns a value to the validation criteria indicating whether or not the first entity and the second entity exist as pair entities in the set of entity pairs 40.

The association module 26 may apply the shared neighbor criteria to the first association. In one embodiment, the association module 26 determines a subset of entities having edges extending a pre-determined distance from the first entity and the second entity. The subset of entities represents an intersection of nodes neighboring the first and second entity. The association module 26 then computes an association value based at least in part on a number of entities included in the subset of entities, and assigns a value to the shared neighbor criteria based on the computed association value.

For example, referring to FIG. 3 and assuming a predetermined distance (e.g., a hop) of one (1) between entities in the graph, the shared entities (e.g., neighboring entities) between Entity A 60 and Entity B 62 are Entity C 64 and Entity D, resulting in a computed association value of two (2) which is assigned to the shared neighbor criteria. As shown in the FIG. 3 example, Entity E 68 and Entity F 70 are more than the pre-determined distance from Entity A 60, and Entity G 72 is more than the pre-determined distance from Entity B 62.

Referring back to FIG. 2, at step 48, the association module 26 may apply the temporal significance criteria to the first association. In one embodiment, the association module 26 applies interestingness criteria to the first association as determined by a first portion of the set of documents and/or a first portion of a structured data store. The first portion is associated with a first time interval. The association module 26 then applies interestingness criteria to the first association as determined by a second portion of the set of documents and/or a second portion of the structured data store. The second portion associated with a second time interval different from the first time interval. The interestingness criteria may include, but is not limited to, one of the following interestingness measures: correlation coefficient, Goodman-Kruskal's lambda (i), Odds ratio ($\alpha$), Yule's Q, Yule's Y, Kappa (K), Mutual Information (M), i-Measure (J), Gini-index (G), Support (s), Confidence (c), Laplace (L), Conviction (V), Interest (I), cosine (IS), Piatetsky-shaporo's (PS), Certainty factor (F), Added Value (AV), Collective Strength (S), Jaccard index, and Klosgen (K).

Once the temporal significance criteria is applied, the association module 26 determines a difference value between a first interestingness measure associated with the first time interval and a second interestingness measure associated with the second time interval. The association module 26 then assigns a value to the temporal significance criteria based on the determined difference value.

The association module 26 may apply the context consistency criteria to the first association. In one embodiment, the association module 26 determines a frequency of the first entity and the second entity occurring in a context of each document of the set of documents 36. The context may include, but is not limited to, organizations, people, products, industries, geographies, commodities, financial indicators, economic indicators, events, topics, subject codes, unique identifiers, social tags, industry terms, general terms, metadata elements, classification codes, and combinations thereof. The association module 26 then assigns a value to the context consistency criteria based on the determined frequency.

The association module 26 also may apply the recent activity criteria to the first association. For example, in one embodiment, the association module 26 computes an average of occurrences of the first entity and the second entity occurring in one of the set of documents 36 and/or the structured data store. The association module 26 then compares the computed average of occurrences to an overall occurrence average associated with other entities in a same geography or business. One the comparison is completed, the association module 26 assigns a value to the recent activity criteria based on the comparison. In various embodiments, the computed average of occurrences and/or the overall occurrence average are seasonally adjusted.

The association module 26 may also apply the current clusters criteria to the first association. In one embodiment, identified entities are clustered together using the clustering module 30. The clustering module 30 may implement any clustering algorithm known in the art. Once entities are clustered, the association module 26 determines a number of clusters that include the first entity and the second entity. The association module 26 then compares the determined number of clusters to an average number of clusters that include entity pairs from the set of context pairs 42 and which do not include the first entity and the second entity as one of the entity pairs. In one embodiment, the defined context is an industry or geography that is applicable to both the first entity and the second entity. The association module 26 then assigns a value to the current cluster criteria based on the comparison.

The association module 26 may also apply the surprise element criteria to the first association. In one embodiment, the association module 26 compares a context in which the first entity and the second entity occur in a prior time interval associated with a portion of the set of documents and/or a portion of the structured data store, to a context in which the first entity and the second entity occur in a subsequent time interval associated with a different portion of the set of documents and/or the structured data store. The association module 26 then assigns a value to the surprise element criteria based on the comparison.

Referring to FIG. 2, once the plurality of criteria are applied to the first association, at step 50, the association module 26 weights each of the plurality of criteria values assigned to the first association. In one embodiment, the association module 26 multiplies a user-configurable value associated with each of the plurality of criteria with each of the plurality of criteria values, and then sums the plurality of multiplied criteria values to compute a significance score. As discussed previously, the significance score indicates a level of significance of the second entity to the first entity. In another embodiment, the association module 26 multiplies a pre-defined system value associated with each of the plurality of criteria, and then sums the plurality of multiplied criteria values to compute the significance score.

Once the significance score is computed, at step 54, the signal module 32 generates a signal including the computed significance score. Lastly, at step 56, the signal module 32 transmits the generated signal. In one embodiment, the signal module 32 transmits the generated signal in response to a received request.

Various features of the system may be implemented in hardware, software, or a combination of hardware and software. For example, some features of the system may be implemented in one or more computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

What is claimed is:

1. A method of computing significance between entities comprising: automatically generating, by an identification module, a directed graph representing entities including a first and a second entity identified in a set of documents, the directed graph comprising a structure comprising a set of nodes and vertices, each node representing an entity identified in the set of documents and vertices of each node representing an association between entities, the directed graph providing for improved relationship and relationship significance identification, quantification, and storage of the entities and information associated with the entities represented in the directed graph;

automatically identifying, by the identification module implementing a search using the structure of the directed graph, the first entity and the second entity from a plurality of entities in the set of documents, the first entity having a first association with the second entity, and the second entity having a second association with the first entity, wherein identification and recall of the first entity and the second entity from the plurality of entities and the set of documents is improved based in part on the structure of the directed graph;

automatically, by a context module executing a set of code, generating a set of context pairs representing a contextual relationship existing between the first and second entities, each context pair representing a context that exists between two entities, wherein the context is a circumstance in which the first and second entities are referenced within a document in the set of documents;

assigning a plurality of criteria values to the first association, the plurality of criteria values based on a plurality of association criteria comprising interestingness, recent interestingness, validation, shared neighbor, temporal significance, context consistency, recent activity, current clusters, and surprise element, the plurality of criteria values being stored in a set of contingency tables;

automatically computing, by an association module, a significance score for the first entity with respect to the second entity based on a sum of the plurality of weighted criteria values for the first association, the significance score indicating a level of significance of the second entity to the first entity, wherein the significance score represents a quantification of the contextual relationship between the first and second entities;

generating, by a signal module, a signal associated with the computed significance score; and     transmitting, by the signal module, the signal.

2. The method of claim 1, further comprising determining by the identification module a frequency and cooccurrence of entities identified in the set of documents.

3. The method of claim 1, further comprising applying, by the association module, an interestingness criteria to the first association and wherein one of the interestingness measures includes a correlation coefficient that measures the degree of linear interdependency between a pair of entities.

4. The method of claim 1, further comprising the association module applying one or more from the group consisting of interestingness criteria, recent interestingness criteria, validation criteria, shared neighbor criteria, temporal significance criteria, recent activity criteria, current clusters criteria, and the surprise element criteria.

5. The method of claim 1, further comprising clustering, by a clustering module, entities identified by the identification module.

6. The method of claim 1, further comprising weighting the plurality of criteria values.

7. The method of claim 1, further comprising multiplying, by the association module, a user-configurable value associated with each of the plurality of criteria values.

8. The method of claim 7, further comprising summing, by the association module, the plurality of multiplied criteria values to compute the significance score.

9. The method of claim 1, wherein the signal module transmits the generated signal in response to a received request.

10. The method of claim 1, further comprising storing, in a data store comprising a relational database, information generated by one or more of the association module, the cluster module, the context module, and the identification module.

\* \* \* \* \*